UNITED STATES PATENT OFFICE.

LESTER KIRSCHBRAUN, OF EVANSTON, ILLINOIS.

PROCESS OF TREATING SATURATED FIBROUS COMPOSITIONS.

1,417,840.  Specification of Letters Patent.  Patented May 30, 1922.

No Drawing. Application filed September 10, 1919, Serial No. 322,990. Renewed October 28, 1921. Serial No. 511,102.

*To all whom it may concern:*

Be it known that I, LESTER KIRSCHBRAUN, a citizen of the United States, residing in the city of Evanston, county of Cook, and State of Illinois, have invented certain new and useful Improvements in Processes of Treating Saturated Fibrous Compositions, of which the following is a specification.

This invention relates to the treatment of paper or felted compositions saturated with asphalt or waterproof binder and has among its salient objects to provide a process for recovering waste scraps of saturated papers such as are produced in the manufacture of roofing and flooring felts; to provide a process for removal of grits and mineral facings attached to the surface of such compositions; to provide a process whereby the waste scraps may be disintegrated into a fibrous pulp and simultaneously recover the asphalt or saturating binder as well as the asphalt protective coating; to provide a process of the recovering of the grit particles used as surfacing; to provide a process of converting the waste scraps with its contained asphalt into a fibrous pulp which is relatively non-adhesive and capable of being moulded into useful articles by means of hydraulic pressure or capable of formation into sheets; to provide in general an improved process and apparatus of the character referred to.

In the manufacture of felt or paper which is saturated with a waterproof binder such as asphalt, the trimmings and broken sections are now waste products. In the manufacture of shingle elements such as strip shingles, the tabs cut out in formation of the notches are also waste. These shingle or roofing elements generally consist of saturated felt, a relatively high melting point asphalt coating and a granular or grit surfacing on the coating. The present invention is adapted to recover and reuse the material of these trimmings, broken sheets or tabs.

The invention may be carried out as follows: The tabs which are generally 4" long by 1" wide or the trimmings or broken parts, first cut to a similar size are put into a cylindrical screen seated in a tank so that the screen can be immersed in water. The screen is provided with agitating paddles, and itself revolves in the tank. The water in the tank is heated to nearly its boiling point. A charge of these tabs or the other waste products is put in the cylinder and subjected to the agitating treatment in the presence of the hot water. This step of the process detaches the grit from the asphalt coating, the grit falls through the screen and is recovered in the bottom of the tank. The temperature is not high enough to cause the coating to melt and detach itself from the felt base nor will the saturant be removed from the fibres.

The mass while still hot and freed from its grit is then placed in a disintegrator where it is more or less emulsified. This may consist of a cylindrical tank which can be heated and is provided with rapidly revolving paddles or disintegrating knives mounted on a shaft extending vertically through the tank. The tank is first partly charged with an aqueous vehicle consisting of an emulsifying agent, as for example, clay of colloidal character. I have found, in some cases, that 50% of clay by weight to 50% of water, will constitute a suitable starting medium. The contents of the tank are then heated to nearly the boiling point. The hot mass of fibre and bitumen is then gradually fed into the disintegrator and the contents thereof subjected to violent agitation and heating which results in resolving the fibrous mass into a pulp and at the same time softens the asphalt. The fibre and bitumen is gradually fed through the disintegrator as stated so as to produce a relatively non-adhesive emulsion in which the water is in the external phase. This operation may be carried on as a continuous operation by feeding in fresh material and withdrawing the more or less emulsified composition. The pulpy mass thus produced may be cooled and then moulded by hydraulic pressure into articles such as buckets, conduits, mats, insulators, shoe elements or many innumerable other waterproof materials. If desired, the pulp may be formed into waterproof sheets to be used as roofings, floorings, wall boards, or other waterproof coverings. The articles so produced are dried and if desired, repressed. The pulpy mass before being formed into the desired shape may have added to it sawdust, cork, various fibres or additional asphalt in emulsified form.

Instead of taking the waste material after the grit has been removed and putting into disintegrator containing the aqueous vehicle referred to, the disintegrator may be filled with a liquid vehicle of non-aqueous character and having a substantially higher boiling point than water, as for example, petroleum oil, fatty acids, petroleum residues, having a boiling point of upwards of 250° F. This oily vehicle permits of the use of a higher temperature than in the case of water thereby facilitating disintegration and separation of the fibres and the vehicle being liquid, dissolves the harder asphalt and produces a mixture in which the bituminous ingredients have a lower melting point. During this disintegrating operation, the vehicle may be heated to 350° F. more or less.

The hot liquid bituminous pulpy mass is gradually fed into an emulsifier containing an aqueous vehicle consisting of water and an emulsifying agent such as clay of colloidal character. The contents of the emulsifier are agitated by means of revolving paddles to emulsify the contents thereof and produce a relatively non-adhesive mixture in which the water is in the external phase. If the vehicle is a fatty acid, the composition may be emulsified merely by the addition of alkali in the aqueous vehicle. This composition can then be cooled or moulded or sheeted as before described. Additional fibre or filler such as sawdust may be added to the mixture before the sheeting or moulding.

The following modifications of the process may be used. The revolving screen may be dispensed with. The tabs or other waste particles with the grit attached are placed in an ordinary paper beater except that it is provided with an air tight cover and capable of withstanding pressure and adapted to be heated. The beater is charged with an aqueous vehicle consisting of water and clay of colloidal character. This vehicle is heated to nearly the boiling point of water, the tabs added and the beater sealed. The temperature is then increased until the desired steam pressure is obtained, say 80# per square inch. As the beating action continues, the grit is first detached and falls to the bottom of the beater, a section of which may be provided with a foraminated bottom to allow the grit to pass through. Or the bottom may be corrugated, permitting the grit to accumulate in the grooves of the corrugation. The fibrous stock is disintegrated and the bitumen softened, which actions are more readily accomplished under the influence of the heat and pressure. If desired, fresh fibre can be added to the beater before the action starts. The result of the operation is to more or less emulsify the bitumen contents and to produce a fibrous pulp of relatively non-adhesive character. The mixture may then be cooled and sheeted or moulded in the manner before described.

I claim as my invention:

1. The process of recovering for reuse, the fibrous and bituminous constituents of waste saturated felt consisting in mechanically disintegrating the fibres with their contained bitumen in the presence of a heated emulsifying agent.

2. The process of recovering for reuse the fibrous constituents of waste saturated felt consisting in disintegrating the fibres with their contained bitumen in the presence of an emulsifying agent.

LESTER KIRSCHBRAUN.